(No Model.)
W. D. DAVIES.
BALANCE WHEEL FOR WATCHES.
No. 322,093. Patented July 14, 1885.
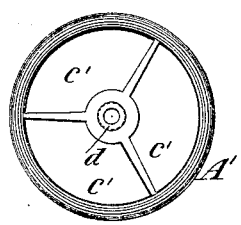
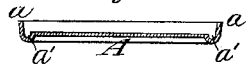
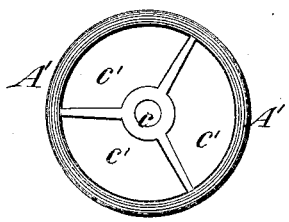
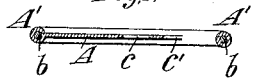
Witnesses:
Henry Hees
Francis Keirnan
Inventor:
Walter D. Davies
by his Attys.
Brown & Hall

UNITED STATES PATENT OFFICE.

WALTER D. DAVIES, OF BROOKLYN, NEW YORK, ASSIGNOR TO THE ANSONIA CLOCK COMPANY, OF ANSONIA, CONNECTICUT.

BALANCE-WHEEL FOR WATCHES.

SPECIFICATION forming part of Letters Patent No. 322,093, dated July 14, 1885.

Application filed January 20, 1885. (No model.)

*To all whom it may concern:*

Be it known that I, WALTER D. DAVIES, of the city of Brooklyn, in the county of Kings and State of New York, have invented a new and useful Improvement in Balance-Wheels, of which the following is a specification.

Two methods have been commonly pursued in making the balance-wheels of clocks. According to one method, the rim of the wheel is made of a ring or short section of tubing, and the hub having been made of another piece of metal the rim and hub are drilled radially and radial wires are driven through the holes in the rim and into the hub to form arms. According to the other method, the whole wheel, rim, hub, and center are turned from a solid piece of metal, the portion within the rim being turned down to very little thickness to make it as light as possible.

When made according to the method first above described, the wheel is expensive, because of the five or more pieces of which it is formed and the labor required to make it, and when made according to the second method the wheel is expensive, because of the large amount of turning and the waste of metal necessary to properly shape the wheel.

The object of my invention is to provide a wheel having a properly-proportioned rim and center, the former being comparatively heavy and the latter light, and which may be made at less cost both for material and labor than those heretofore used.

The invention consists in a balance-wheel consisting of a disk of sheet metal having the margin or edge rolled or turned inward to form a hollow rim, and by preference having inclosed or confined in said rim by the operation of rolling or turning it inward a ring or annular filling-piece of metal to add to the weight of the rim. The portion of the disk within the rim may be cut out to form arms, and as the sheet metal of which it is composed will be usually thin I may secure at the center by soldering or riveting a collet or little collar to form a hub.

In the accompanying drawings, Figures 1 to 6, inclusive, are views illustrating the different operations in the method of making a wheel embodying my invention. Figs. 7 and 8 are, respectively, an elevation and section of the completed wheel; and Fig. 9 is a sectional view of a wheel of slightly-modified form also embodying my invention.

Similar letters of reference designate corresponding parts in the several figures.

I first take a circular blank, of brass or other sheet metal, A, such as is shown in Fig. 1, and by a stamping and cupping operation I turn its edge or margin $a$ upward and form in it an annular concave seat or channel, $a'$, the transverse section of which is shown in Fig. 2. I then place in the seat or channel $a'$ a ring, $b$, which may be of brass or iron wire, and which is shown in transverse section in Fig. 3, and I then roll or turn inward the edge or margin $a$ substantially as shown in transverse section in Fig. 4, in order to confine the ring $b$ and complete the rim $A'$ of the wheel. This having been done, a central hole, $c$, may be punched, and other holes, $c'$, punched to form a light center to the wheel, as shown in Figs. 5 and 6. The metal from which the disk is made is usually thin, and to form a suitable hub for the wheel I may solder or rivet in the center hole, $c$, a flanged collet or small collar, $d$, which forms the hub, as shown in Figs. 7 and 8.

The wheel A A' shown in Fig. 9 differs from that shown in Figs. 7 and 8 only in having the filling-ring $b$ omitted and having a hollow rim, A'. The operations of forming this wheel are the same as above described, save that the ring $b$ is not placed therein before rolling or turning the edge or margin $a$ inward, as shown in Fig. 4.

By the method of manufacture above described the cost of the balance-wheel is greatly reduced, and the several operations may all be cheaply performed by dies such as are used in working sheet metal. The wheel may be of any size desired, and by using a filling-piece, $b$, of heavier wire or larger transverse section, the rim may be made as heavy as desired.

What I claim as my invention, and desire to secure by Letters Patent, is—

1. A balance-wheel consisting of a disk of sheet metal, having its edge or margin rolled or turned inward to form a rim, substantially as and for the purpose herein described.

2. A balance-wheel consisting of a disk of sheet metal, having its edge or margin rolled or turned inward to form a rim, and having an annular filling piece or ring within the rim to add weight thereto, substantially as herein described.

3. A balance-wheel consisting of a disk, A, having its edge or margin rolled or turned inward to form a rim, A', and having a collet or bush secured at its center to form a hub, substantially as herein described.

WALTER D. DAVIES.

Witnesses:
FREDK. HAYNES,
FRANCIS X. KEIRNAN.